T. T. TASKER.
Mode of Regulating the Furnace of Hot Water Apparatus.
No. 2,246. Reissued May 15, 1866.
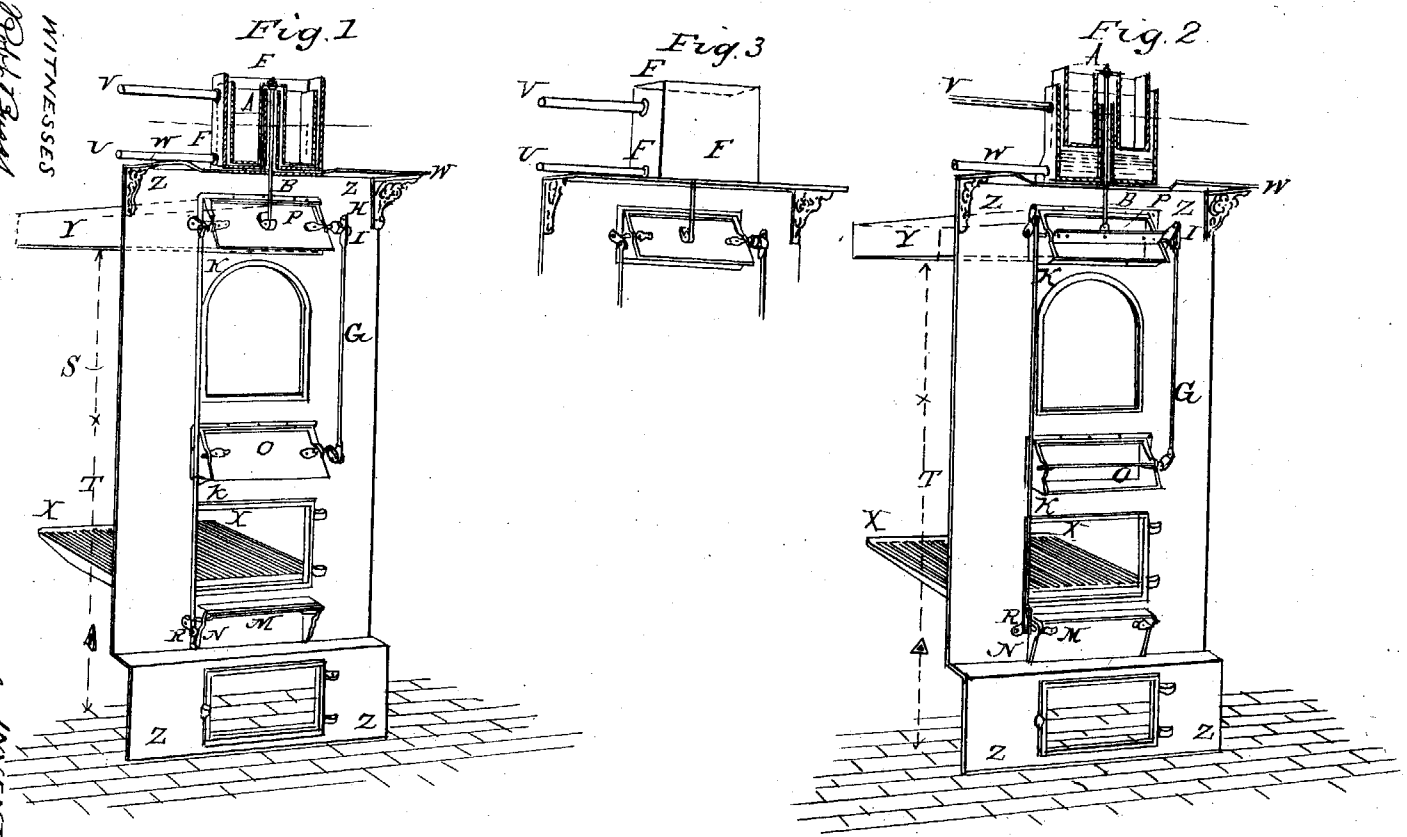
WITNESSES
Robt Biggs
J. R. Tasker
INVENTOR
Thomas T. Tasker
N. PETERS. Photo-Lithographer, Washington, D. C.

UNITED STATES PATENT OFFICE.

THOMAS T. TASKER, SR., OF PHILADELPHIA, PENNSYLVANIA.

MODE OF REGULATING THE TEMPERATURE OF HOT-WATER APPARATUS.

Specification forming part of Letters Patent No. 12,039, dated December 5, 1854; Reissue No. 2,246, dated May 15, 1866.

*To all whom it may concern:*

Be it known that I, THOMAS T. TASKER, Sr., of Philadelphia, in the county of Philadelphia, in the State of Pennsylvania, have invented a new and Improved Mode of Regulating the Temperature of Hot-Water Heating Apparatus; and I do hereby declare the following to be a full and exact description thereof, which will enable others skilled in the art to make and use the same, reference being had to the accompanying drawings, forming part of this specification, wherein—

Figure 1 represents a perspective view of the front of the furnace to be used with the regulating-dampers and float in the position for increasing the temperature, the float and float-box being shown in section; and Fig. 2 represents the same view with the regulating-dampers and float in the position for reducing the temperature. Fig. 3 represents the float and float-box or tank in front view, and Fig. 4 represents a thermometer, Z Z Z Z being the front furnace-plate of any hot-water heating apparatus; W, a shelf on which can be placed the float-box F; U, a pipe connecting the float-box to the circulation; V, an overflow-pipe for float-box; Y, a duct or air-box opening to chimmey above boiler; X, the grate; S, the place occupied by the boiler; T, the place occupied by the fuel and fire, and △ the ash-pit.

The letters of reference indicate in all the views similar parts.

The hot-water heating apparatus may be constructed in any of the known forms either as regards boiler or circulating-pipes in connection with it, it being only necessary that the tank or float-box F should be placed above the level of the boiler or circulation and be of such proportions that the difference of expansion of the water within the apparatus and of the metal pipes of which it shall be formed shall produce sufficient oscillation of the level of the water within the tank or float-box F to give the motion required for opening and closing the dampers.

In practice, I prefer the arrangement of float and dampers shown in the drawings, where A represents the float, an open vessel resting on the surface of the water in the tank or float-box F. B represents the rod connecting the float to and operating the smoke-flue damper P. K represents the rod operating the ash-pit damper M, and G represents the rod operating the fire-damper O.

At the lower end of the rod K is the link R, in which rests the end of the crank N of the damper M, whereby when the float A begins to move, and that motion is communicated to the damper P, which impairs the draft by admitting cold air into the smoke-flue, the ash-pit damper M then closes and shuts off the supply of air under the grate simultaneously with the opening of the damper P until M is shut, after which the link R allows the damper P to move independently.

At the upper end of the rod G is the link H, in which moves the end of the crank I, attached to P, whereby when the float A has moved so far as to have half, or about half, opened the damper P, and to have closed, or about closed, the damper M, then the fire-damper O moves simultaneously with P, whereby cold air is admitted over the fire and against the boiler, to aid in the reduction of the temperature. I prefer this arrangement of dampers to attempting to control the fire and heat of the water by either a single one of them or of any two combined, and I also prefer controlling through diminishing the draft, by admitting cold air, and by regulating the supply of air beneath the grate to the fuel, to employing a damper in the smoke-flue itself, either alone or in combination with any one or more of these three dampers which I have shown, especially that my proposed arrangements allow unobstructed discharge through the chimney at all times of the gases of combustion.

As the expansion of water contained in a hot-water heating apparatus is the proposed operating force in raising or depressing the float or floats, and thus producing motion for opening or shutting the damper or dampers, it is evident that the admission of water into such apparatus or the drawing off of water from such apparatus will similarly actuate the float or floats, and hence the temperature of the water of the apparatus can be controlled by the quantity of water present, and can be regulated at such temperature as shall give the largest quantity of warmed air heated to the lowest degree compatible with the out-of-doors temperature.

This improvement in regulating is also applicable to hot-water apparatus working with closed circulation, in which case the rod connecting with the float can be operated through a stuffing-box, and the regulation be carried by the expansion of water above the boiling-point.

I am aware that a float has been used in a stand-pipe or tank attached to a low-pressure steam-boiler, the level of the water in the stand-pipe or tank being changed by the pressure of steam within the boiler acting upon the column in the pipe or tank, the said float being in combination, by means of a rod, with a damper for regulating the fire.

I am also aware that a float has been used in the tank of hot-water apparatus to maintain a constant supply of water against evaporation or leak by operating a cock connected to a supply-pipe.

I am aware that dampers have been operated by floats resting on the surface of mercury or other liquid, the level of which mercury or other liquid surface was made variable by the expansion of air or ether in sealed vessels, wherein the mercury or other liquid becomes the seal, which vessels are immersed in heated water.

I am aware that dampers controlling the fire of boilers and cooking apparatus, by closing the chimney, by closing the ash-pit, by admitting air into the chimney, and impairing the draft, have been singly and in combination used.

I am aware that dampers have been operated by thermostats composed of metallic bars through various systems of rods; but

I claim as my invention and desire to secure by Letters Patent—

1. The combination of a float actuated by the expansion of water with a draft or smoke damper as the means of regulating the temperature of a hot-water heating apparatus, substantially as and for the purposes described.

2. The use of the damper O for admitting cold air over the fire as a means of cooling the gases of combustion, of reducing the draft, and of cooling the water in the boiler, either alone or in combination with other dampers.

3. The use of a simultaneous motion for the dampers P and M and the succeeding simultaneous motion for the dampers P and O, as described.

4. The combination of the three dampers P O M with the float A, together with the rods G K and the link R H, for the purpose and object herein described.

Philadelphia, November 29, 1865.

THOMAS T. TASKER., SR.

Witnesses:
ROBT. BRIGGS,
JOS. R. TASKER.